(12) United States Patent
Salkintzis

(10) Patent No.: US 11,729,579 B2
(45) Date of Patent: Aug. 15, 2023

(54) METHOD AND DEVICE FOR FACILITATING RESTRICTED PROXIMITY DISCOVERY OF AN APPLICATION USER

(71) Applicant: MOTOROLA MOBILITY LLC, Chicago, IL (US)

(72) Inventor: Apostolis K. Salkintzis, Athens (GR)

(73) Assignee: MOTOROLA MOBILITY LLC, Chicago, IL (US)

( * ) Notice: Subject to any disclaimer, the term of this patent is extended or adjusted under 35 U.S.C. 154(b) by 999 days.

(21) Appl. No.: 14/709,571

(22) Filed: May 12, 2015

(65) Prior Publication Data

US 2016/0242027 A1 Aug. 18, 2016

Related U.S. Application Data

(60) Provisional application No. 62/116,491, filed on Feb. 15, 2015.

(51) Int. Cl.
| | |
|---|---|
| *G06F 15/16* | (2006.01) |
| *H04W 4/02* | (2018.01) |
| *H04W 8/00* | (2009.01) |
| *H04W 4/08* | (2009.01) |
| *H04W 8/18* | (2009.01) |
| *H04W 12/02* | (2009.01) |

(Continued)

(52) U.S. Cl.
CPC ............ *H04W 4/023* (2013.01); *H04W 4/08* (2013.01); *H04W 8/005* (2013.01); *H04W 8/183* (2013.01); *H04W 12/02* (2013.01); *H04W 48/14* (2013.01); *H04W 76/14* (2018.02)

(58) Field of Classification Search
CPC ..... H04W 12/02; H04W 4/023; H04W 8/005; H04W 8/183; H04W 48/14
USPC .......................................................... 709/205
See application file for complete search history.

(56) References Cited

U.S. PATENT DOCUMENTS

| | | | |
|---|---|---|---|
| 2007/0049314 A1* | 3/2007 | Balachandran | ....... H04W 52/50 |
| | | | 455/518 |
| 2013/0151608 A1* | 6/2013 | Wiseman | .............. H04L 67/306 |
| | | | 709/204 |
| 2013/0288668 A1 | 10/2013 | Pragada et al. | |

(Continued)

OTHER PUBLICATIONS

International Search Report and Written Opinion for WO Application PCT/US2016/012262 dated Jun. 13, 2016.

(Continued)

*Primary Examiner* — Suraj M Joshi
*Assistant Examiner* — Joel Mesa

(57) ABSTRACT

A proximity-based services server performs a method for facilitating restricted proximity discovery of a user of an application. The method includes obtaining authorization to access a first user's resources for a first application. The method also includes communicating a list of associates from the first user's resources and receiving an indication of a set of associates selected from the list of associates. Each associate in the set is permitted to discover the first user. The method further includes receiving a request for a proximity-based services code and allocating a first proximity-based services code to the first user for the first application. Additionally, the method includes announcing, to a set of other proximity-based services servers, existence of the first proximity-based services code allocated to the first user for the first application.

14 Claims, 5 Drawing Sheets

(51) Int. Cl.
*H04W 48/14* (2009.01)
*H04W 76/14* (2018.01)

(56) References Cited

U.S. PATENT DOCUMENTS

2014/0341132 A1* 11/2014 Kim ..................... H04W 8/005
370/329
2015/0026261 A1* 1/2015 Shimakawa ........ H04L 65/1013
709/204

OTHER PUBLICATIONS

Huawei et al., "Authorization for restricted ProSe direct discovery," 3GPP Draft; S3-151170-Revised-S3-151053-PCR-Authorisation for Restricted Prose Direct Discovery, 3rd Generation Partnership Project (3GPP), Mobile Competence Centre; 650, Route Des Lucioles; F-06921, Jan. 30, 2015.

3rd Generation Partnership Project; Technical Specification Group Services and System Aspects; Study on extended architecture support for Proximity-based services (Release 13), 3GPP Draft; 23713-040-RM, 3rd Generation Partnership Project (3GPP), Mobile Competence Centre; 650, Route Des Lucioles; F-06921 Sophia-Antipolis Cedex-France, Feb. 13, 2015, XP050945601.

3GPP TR 23.713 V0.3.0 (Nov. 2014), 3rd Generation Partnership Project; Technical Specification Group Services and System Aspects; Study on extended architecture support for Proximity-based services (release 13), Section 5.1, Section 5.2 (Model B), and Section 5.3.

W. Dong, V. Dave, L. Qiu, Y. Zhang, "Secure Friend Discovery in Mobile Social Networks," Proceedings of the IEEE 2011 INFOCOM, Apr. 10-15, 2011, pp. 1647-1655.

M. Jadliwala, J. Freudigery, I. Aadz, J-P. Hubauxy, and V. Niemiz, "Privacy-Triggered Communications in Pervasive Social Networks," 2011 IEEE International Symposium on World of Wireless, Mobile and Multimedia Networks (WoWMoM), Jun. 20-24, 2011, pp. 1-6.

* cited by examiner

METHOD AND DEVICE FOR FACILITATING RESTRICTED PROXIMITY DISCOVERY OF AN APPLICATION USER

RELATED APPLICATIONS

The present application is related to and claims benefit under 35 U.S.C. § 119(e) from U.S. Provisional Patent Application Ser. No. 62/116,491, filed Feb. 15, 2015, titled "Method and Device for Facilitating Restricted Proximity Discovery of an Application User", the entire contents of which are incorporated herein by reference.

FIELD OF THE DISCLOSURE

The present disclosure relates generally to discovery of an application user and more particularly to a method and device for restricted discovery of a first user by selected other users who are in proximity to the first user and are associated with the first user through an application.

BACKGROUND

In the context of a Proximity-based Services (ProSe) project that has been active in a $3^{rd}$ Generation Partnership Project (3GPP) Service and System Aspects (SA2) working group, there has been work to specify a ProSe solution that supports restricted discovery, also referred to herein as restricted proximity discovery. Basically, restricted discovery provides a mechanism for a second user of an application to discover a first user of the application when both users are in close proximity, but only when the first user has explicitly consented to be discoverable by the second user. Accordingly, restricted discovery enables a user to restrict the number of his friends on a social networking application, for example, who can discover him.

To support restricted discovery, some solutions have been proposed in SA2, for instance as documented in 3GPP Specification TR 23.713 v0.3.0 (2014-11), clause 5. A shortcoming of these proposed solutions is that they require changes to applications, such as Facebook, Twitter, Google+, Instagram, etc. For example, to enable Facebook restricted discovery, the application running on the Facebook servers must be modified as well as the application programming interfaces (APIs) supported by the Facebook servers. These requirements could lead to very limited or even no deployment of the proposed solutions in practice.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

Figure 1:
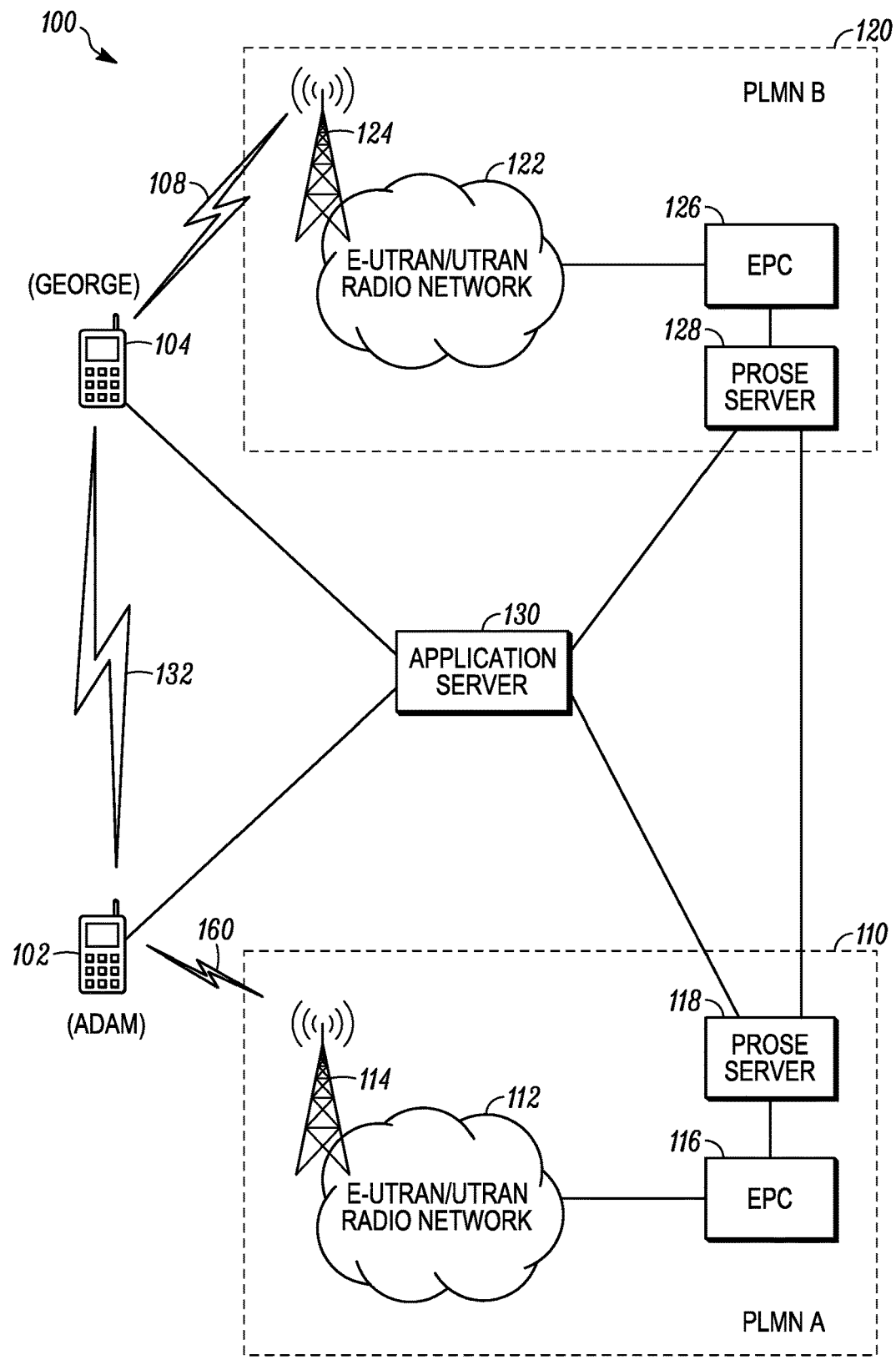
FIG. 1 is a schematic diagram illustrating an environment in which at least one ProSe server and user device is configurable in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Pursuant to the various embodiments are methods and proximity-based services servers, which can reside in one or more cellular networks, and which are configured for facilitating restricted discovery of a user of an application. For a particular embodiment that facilitates announcement of the presence of a first user, a first proximity-based services server activates proximity services for a social networking application for the first user, which includes obtaining authorization to access the first user's resources for the social networking application. The first proximity-based services server presents the first user with a list of friends from the social networking application for selecting the friends that are permitted to discover the first user. Responsive to a request from the first user, the first proximity-based services server allocates a proximity-based services code to the first user for the social networking application, wherein a device of the first user can announce the code locally. The first proximity-based services server also announces existence of the first proximity-based services code to a set of other proximity-based services servers, which includes a second proximity-based services server.

For facilitating monitoring the presence of the first user, the second proximity-based services server activates proximity services for the social networking application for a second user. Upon receiving, from the second user, a request to monitor for the presence of the first user, the second proximity-based services server confirms that the first user is a friend of the second user on the social networking application before requesting the first proximity-based services code for the first user from the first proximity-based services server. The second proximity-based services server provides the first proximity-based services code to a device of the second user to use in monitoring for the presence of the first user by detecting the announcement by the device of the first user of the first proximity-based services code when the first and second users are in close proximity.

Disclosed embodiments do not require any changes to the application servers or the APIs supported by the application servers. Accordingly, the embodiments provide a solution for restricted discovery that can be deployed, for instance, by cellular operators and which enables the cellular operators to control the restricted discovery functionality using processes that are transparent to the application servers.

FIG. 1 illustrates a schematic diagram of an example environment 100 within which may be implemented methods and devices for facilitating restricted discovery of a user of an application, in accordance with the present teachings. As illustrated, environment 100 includes a public land mobile network (PLMN) A 110, a PLMN B 120, and an application server 130. As shown, a user Adam can operate his user device 102, in this case a wireless communication device, to establish a link 160 to wirelessly connect to PLMN A 110. Similarly, a user George can operate his user device 104 to establish a link 108 to wirelessly connect to PLMN B 120. For a particular implementation scenario, Adam is a cellular subscriber in PLMN A 110 and can, thereby, receive from PLMN A 110 services such as ProSe services, including restricted discovery services implemented in accordance with the present teachings. Similarly, George is a cellular subscriber in PLMN B 120 and can, thereby, receive from PLMN B 120 services including restricted discovery services.

Each PLMN includes an access network, e.g., 112 and 122, which can use any type of radio access technology (RAT) for a wireless communication device to access and communicate using the access network. For the embodiment shown, the access networks 112 and 122 are cellular access networks, also referred to herein as a cellular networks, having at least one cellular tower or base station, e.g., 114 and 124, for facilitating the establishment of wireless links by user devices to the access networks.

The PLMNs A 110 and B 120 also include a core network, e.g., 116 and 126, and a ProSe server or ProSe function, e.g., 118 and 128, connected to the core network. As shown, the cellular networks 112 and 122 and the core networks 116 and 126 are implemented using 3GPP standards or specifications, for example as Long-Term Evolution (LTE) networks. More particularly, the cellular networks 112 and 122 are Evolved UMTS Terrestrial Radio Access Networks (E-UTRANs) or legacy UTRANs having at least one eNodeB, e.g., 114 and 124, for facilitating wireless links to user equipment (UE) such as wireless communication devices 102 and 104. The core networks 116 and 126 that support the cellular networks 112 and 122 are, correspondingly, System Architecture Evolution (SAE) cores, also referred to in the art as Evolved Packet Cores (EPCs). The EPC subcomponents (not shown) can include, among other subcomponents, a Mobility Management Entity (MME), a Serving Gateway (S-GW), a PDN Gateway (P-GW), a Home Subscriber Server (HSS), etc.

Although in the illustrated embodiment the cellular access networks 112 and 122 use E-UTRA as the RAT, any other cellular or cellular-based access technology can be used. Such technologies include, but not limited to: an analog access technology such as Advanced Mobile Phone System (AMPS); a digital access technology such as Code Division Multiple Access (CDMA), Time Division Multiple Access (TDMA), Global System for Mobile communication (GSM), integrated Digital Enhanced Network (iDEN), General Packet Radio Service (GPRS), Enhanced Data for GSM Evolution (EDGE), etc.; and/or a next generation access technology such as Universal Mobile Telecommunication System (UMTS), Wideband CDMA (WCDMA), IEEE 802.16, etc., or variants thereof.

Additionally, although not shown, environment 100 can further include other networks coupled to and supported by the core networks 116 and 126 and accessible to user devices 102 and 104. Such networks include, for example: the Internet; one or more packet data networks (PDNs); or one or more Wireless Local Area Networks (WLANs). The WLANs have at least one access point for facilitating wireless links using, for instance, Institute of Electrical and Electronics Engineers (IEEE) 802.11 standards, also referred to in the art as WiFi technology, or using Worldwide Interoperability for Microwave Access (WiMax) technology. A PDN can be, for instance, an enterprise network, an IP Multimedia Subsystem (IMS), etc.

The application server 130 is used to provide services to users, such as Adam and George, to become associates of one another by forming connections using an application, downloaded to a user device. The downloaded application interacts with a corresponding application on the application server 130. For one example, the application server resides in the Internet, which is accessible by user devices 102 and 104 and ProSe servers 118 and 128 through Internet connections.

For a particular embodiment, the application server 130 is a social networking server that provides social networking services that enable a user to build and/or maintain social relationships. Particularly, the social networking service allows a user to establish a profile that contains selected personal information of the user, such as interests, education history, work history, etc., and to establish a list of associates called "friends," which can include a list of application identifiers. The list of friends is authorized to interact with the user, and at least some of the user's friends may also be authorized to view a portion of the information in the user's profile. The user accesses the social networking application using credentials that include a user identification or identifier (ID) and password. The user's information on (e.g., profile and associate list) and credentials for the application are collected referred to herein as the user's "resources." Some currently popular social networking services used worldwide include Facebook, Google+, LinkedIn, Instagram, Pinterest, Vine, Tumblr, and Twitter.

The ProSe servers 118 and 128 are configured to provide proximity-based services to users that allow users to discover one another. One type of proximity-based service is restricted ProSe discovery or restricted discovery. Restricted discovery enables users of an application and associated application services, such as a social networking application and associated social networking services, to select which other users of the application can discover them. Particular embodiments of restricted discovery are described below by reference to FIG. 2 and FIG. 3.

Figure 2:
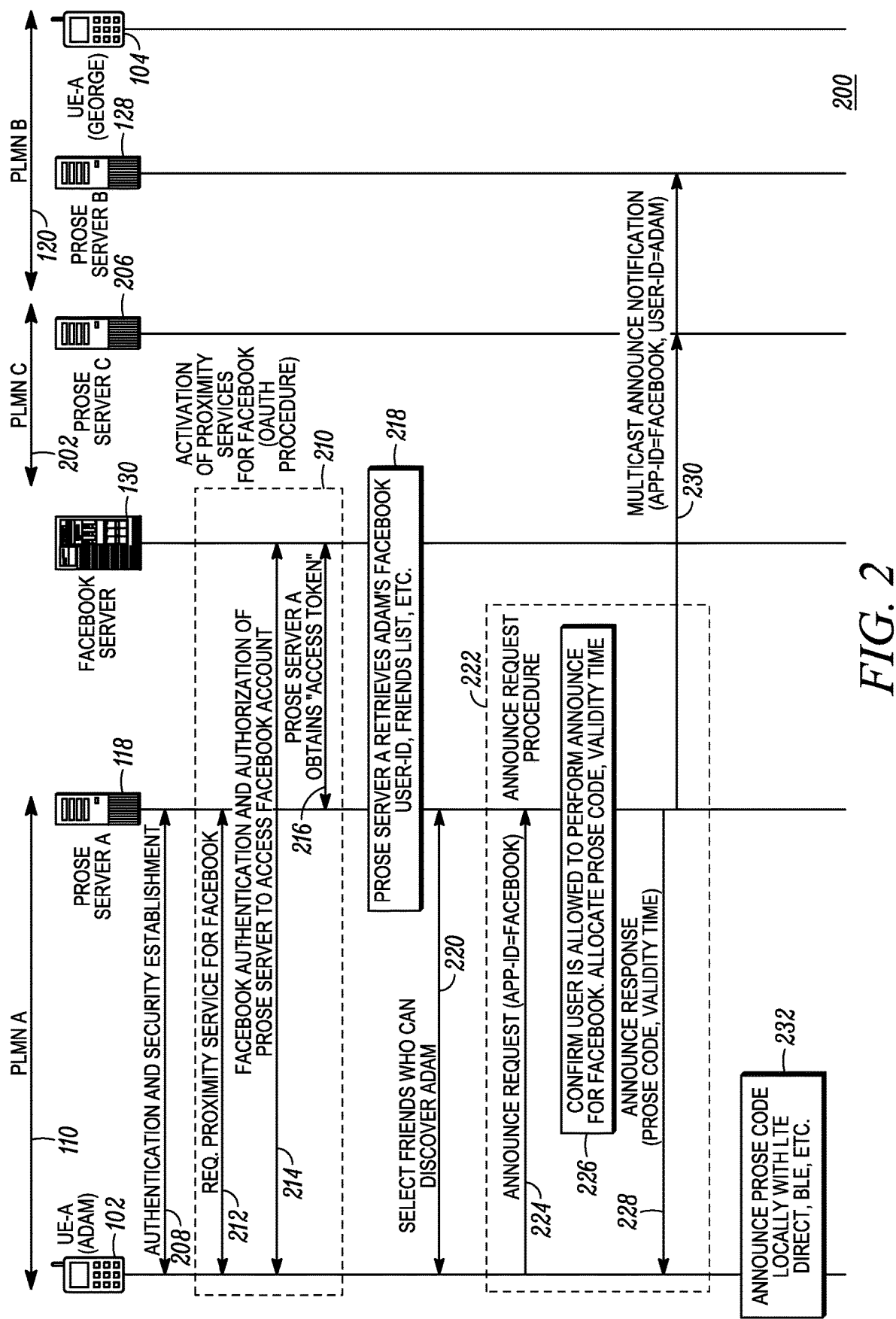
FIG. 2 is a message sequence diagram illustrating collaborative functionality for facilitating restricted discovery of a user of an application in accordance with an embodiment.
Figure 3:
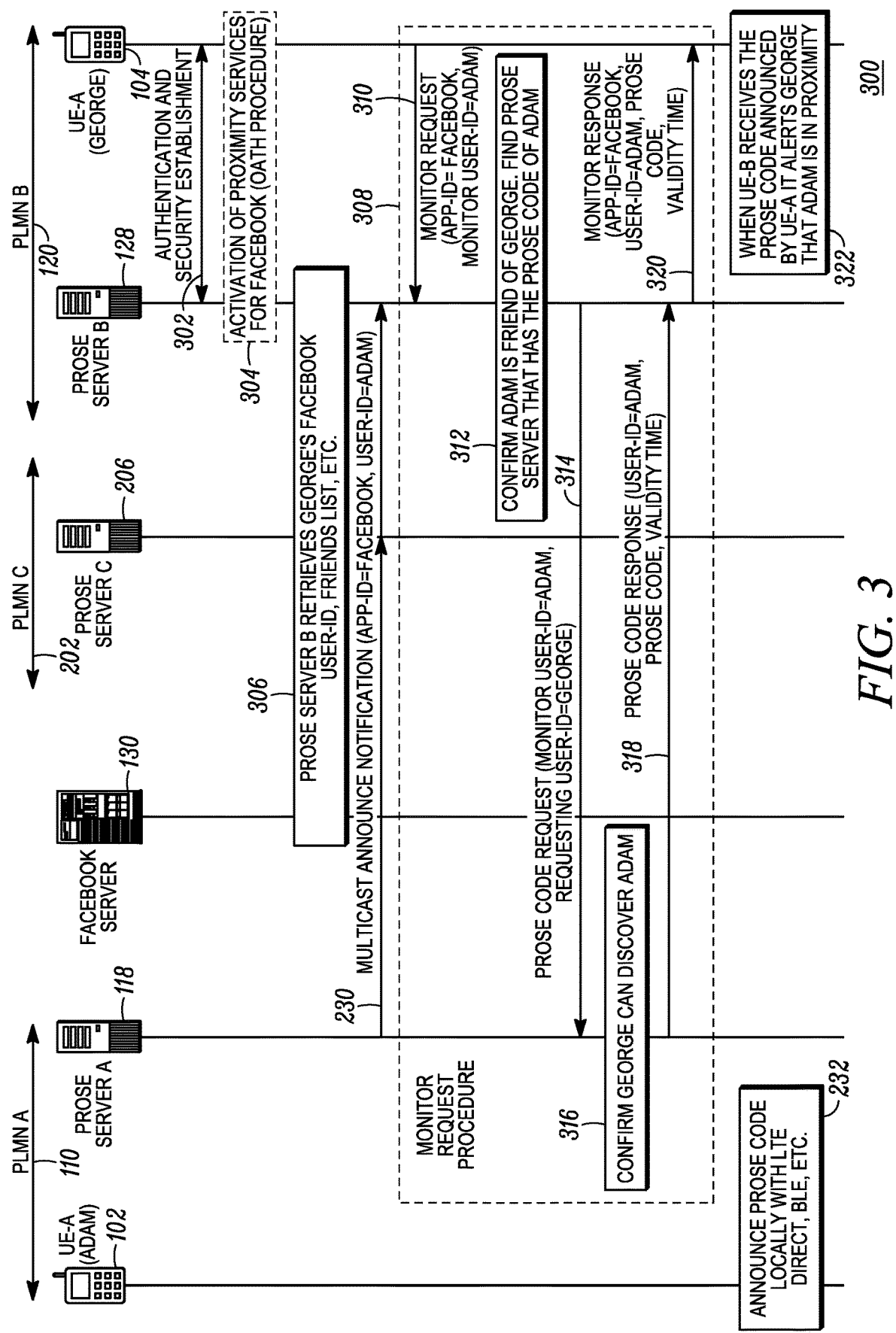
FIG. 3 is a message sequence diagram illustrating collaborative functionality for facilitating restricted discovery of a user of an application in accordance with another embodiment.

FIG. 2 is a message sequence diagram 200 illustrating collaborative functionality for facilitating restricted discovery of a first user (e.g., Adam) by enabling Adam to announce his presence. FIG. 3 is a message sequence diagram 300 illustrating collaborative functionality for facilitating restricted discovery of Adam by enabling a second user authorized by Adam (e.g., George) to associate Adam's announcements with Adam and to, thereby, discover Adam when Adam and George are in close proximity. Close proximity means, for instance, within wireless communication range. For one embodiment, close proximity means within range for Adam and George to use their respective devices 102 and 104 to communicate over a direct connection 132 using a wireless peer-to-peer (P2P) technology such as LTE-Direct, WiFi-Direct or Bluetooth low energy (BLE).

Diagrams 200 and 300 show messages being exchanged between two or more of the devices of: Adam's user equipment (UE) 102; the ProSe server 118 of PLMN A 110; the application server 130, which in this example is a Facebook server; George's UE 104; the ProSe server 128 of PLMN B 120; and a ProSe server 206 of PLMN C 202. The message exchanges can be in accordance with any suitable protocol either standard or proprietary including, but not limited to, OAuth protocol, Hypertext Transfer Protocol (HTTP), Internet Protocol (IP), etc. For an embodiment, Adam and George download to their user devices a proximity-based services (ProSe) application from the operator of their respective cellular networks. The ProSe application facilitates the exchange of messages between Adam's and George's UEs and the respective ProSe servers 118 and 128 to enable restricted discovery for the Facebook application.

Let us assume for the purposes of this use case scenario that Adam and George are Facebook friends, and George desires to know when Adam is nearby, e.g., within communication range. Accordingly, Adam launches the ProSe application on his UE 102. The ProSe application makes a secure connection with the ProSe server 118 (the address of which can be preconfigured or discovered with the Domain Name System), and Adam is authenticated using a message exchange 208 between Adam's UE 102 and the ProSe server 118. Authentication and security establishment message exchange 208 enables the ProSe server 118 to confirm authorization of Adam for using proximity-based services for applications such as Facebook. After successful authentication, the ProSe server 118 knows the MSISDN and/or IMSI of UE 102, and can, therefore, charge Adam and determine if Adam is subscribed to certain proximity-based services.

Messages 210 can then be exchanged between Adam's UE 102, the ProSe server 118 and the Facebook server 130 to activate proximity-based services for Adam for Facebook. Namely, Adam uses the ProSe application to initiate a message exchange 212 between his UE 102 and the ProSe server to request proximity-based services for Facebook. For a particular example, through the ProSe application on the UE 102, Adam is presented with a page that asks, for example, whether to "Activate Discovery for Facebook". Upon Adam indicating his desire to activate restricted discovery for Facebook, for instance through clicking or activating an icon, messages 214 are exchanged between Adam's UE 102, the ProSe server 118, and the Facebook server 130 to enable the ProSe server 118 to obtain authorization to access Adam's resources for Facebook.

For an embodiment, the OAuth protocol is used to facilitate the authorization procedure. The OAuth protocol is an open standard to authorization, which can be used to provide the ProSe server 118 a secured delegated access to Adam's Facebook resources, such as Adam's Facebook ID, friend list, etc., on behalf of Adam without the Facebook server 130 sharing Adam's password with the ProSe server 118. For a particular embodiment, the OAuth procedure is implemented in a manner consistent with how it is commonly used today such that changes at the Facebook server 130 and changes to APIs used by the Facebook server 130 are not required.

Namely, Adam is redirected to the Facebook application on his UE 102 to login using his Facebook credentials. This enables Facebook authentication 214, and Adam is, therein, presented through the ProSe application with a request for permission to allow the ProSe application (or, equivalently, the ProSe server 118) to access his Facebook account and resources. Upon Adam granting this permission, the Facebook authorization procedure further includes the Facebook server 130 granting and the ProSe server 118 receiving, through messages 216, an access token to use in performing API calls on behalf of Adam. Thus, all the requests made by the ProSe server 118 to the Facebook server 130 will include the access token to enable the Facebook server 130 to authenticate and authorize the requests.

Using a message exchange 218, ProSe server 118 uses its access token to request and receive information from Adam's Facebook account, such as Adam's user ID and his friend list. Using messages 220, the ProSe server 118 communicates Adam's list of friends to him via the ProSe application on his UE 102, which is also used to communicate to the ProSe server 118 Adam's selection of which of his friends can discover him. The ProSe server 118 stores the set of selected friends for future use.

When Adam wants to start announcing his presence so that authorized Facebook friends can discover him, he initiates an announce request procedure 222 using the ProSe application on his UE 102. For example, Adam selects "Start Facebook announcements" in the ProSe application to cause his UE 102 to send a message 224 that includes a request to announce Adam's presence for discovery by his set of selected Facebook friends. The request 224, accordingly, includes Adam's Facebook ID and, in an embodiment, serves as or includes a request for a proximity-based services code. An allocated proximity-based services code is used to determine presence of Adam when a device of a second user, which has received the allocated proximity-based services code from a proximity-based services server, is in proximity to receive a broadcast of the allocated proximity-based services code by Adam's UE 102.

Upon receiving the request 224, the ProSe server 118 confirms 226 that Adam is allowed (e.g. by subscription) to perform Facebook announcements and then allocates 226 a ProSe Code for Adam for the Facebook application. For an embodiment, the ProSe code is a random or pseudo-random number or sequence of digits with sufficient length. The ProSe code may also include the identity of the PLMN that allocated this ProSe code. Moreover, the ProSe code is allocated with an associated validity duration, for example one day. The ProSe server 118 sends an announce response message 228 to Adam's UE 102. The response message 228 includes the allocated ProSe code and associated validity time.

The ProSe server 118 also announces, using a message 230 to a set of other ProSe servers (in this case ProSe servers 128 and 206), existence of the ProSe code allocated to Adam for Facebook. For a particular example, the ProSe servers 118, 128, and 206 have joined a multicast group that has an associated multicast address for exchanging secure communications. Accordingly, announcing the ProSe code allocated to Adam for Facebook includes the ProSe server 118 multicasting 230 an announce notification to the other ProSe servers 128 and 206 in multicast group. The announce notification message 230 includes an ID for the Facebook application and a user ID, e.g., a Facebook ID for Adam, to inform all other ProSe servers that monitor the multicast address that ProSe server 118 holds the ProSe code for user Adam for Facebook.

After receiving the allocating ProSe code sent by the ProSe server 118 using the message 228, Adam's UE 102 starts announcing or broadcasting 232 this allocated code to indicate Adam's presence. Such announcing can be locally performed in the clear using technology such as LTE-direct, WiFi-direct, or BLE, for example. Moreover, for this scenario, the allocated ProSe code can be broadcast until its validity time expires, wherein the announce request procedure 222 must be re-executed for the ProSe server 118 to allocate a new ProSe code for Adam for Facebook. Those UEs in close proximity to Adam's UE 102 can receive the ProSe code broadcast by UE 102, but won't be able to associate it with an application and a user unless the UE already possesses the ProSe code for comparison, which is explained by reference to FIG. 3. For another embodiment, Adam's UE 102 locally broadcasts multiple ProSe codes for multiple applications, e.g. one for Facebook, one for Twitter, one for Google+, etc.

When a user on Adam's list of selected friends wants to discover Adam, e.g., a discovering user, the discovering user's device and a ProSe server in the discovering user's cellular network perform authentication and security establishment in a manner similar to that performed by ProSe server 118 and Adam's UE 102 using the messages 208. Additionally, the discovering user's device, the ProSe server in the discovering user's cellular network, and the Facebook server 130 exchange messages (similar to the messages 210 exchanged between UE 102, ProSe server 118, and Facebook server 130) to activate proximity-based services for the discovering user for Facebook.

For example, where George is the discovering user, George opens the ProSe application on his UE 104 to initiate an exchange of messages 302 to establish a secure connection between his UE 104 and the ProSe server 128, to enable the ProSe server 128 to authenticate George. George's UE 104, the ProSe server 128, and the Facebook server 130 exchange messages 304 in response to George's input through his ProSe application, to activate proximity-based services for George for Facebook, including the ProSe server 128 obtaining authorization to access George's resources for the Facebook application. For a particular embodiment, the ProSe server 128 obtaining authorization to access George's resources for Facebook includes using the Oauth protocol to receive an access token from the Facebook server 130 to use in performing application program interface calls to the Facebook server on behalf of George.

Namely, the ProSe application on George's UE 104 presents George with a list of applications, e.g. Facebook, Twitter, Google+, etc. To discover Facebook friends (like Adam) in close proximity, George selects Facebook from the list of applications. The cellular operator in PLMN B 120 may charge George for this type of service provision. George is then redirected to his Facebook application and is prompted to login with his Facebook credentials. After successful login, George is prompted to authorize the ProSe application (or, equivalently, the ProSe server 128), to access certain resources from his Facebook account. An example message presented can be similar to the following: "AT&T Proximity Service wants to access your public profile and friends list". George clicking OK essentially authorizes the ProSe server 128 to access certain resources from George's Facebook profile.

Using a message sequence 306 which includes the access token, the ProSe server 128 obtains a list of George's Facebook friends from the Facebook server 130. The ProSe server 128 can use George's list of friends to confirm a friend that George wants to discover (described later in more detail). The ProSe server 128 can also present George's list of friends to George, through the ProSe application on his UE 104, from which George can select those friends who can discover him.

For George to monitor for the presence of Adam, his UE 104 must receive the ProSe code allocated to Adam for Facebook. For this purpose, a monitor request procedure 308 is performed between George's UE 104, the ProSe server 128, and the ProSe server 118. More particularly, George can select an option in his ProSe application to cause his UE 104 to send a monitor request message 310 to the ProSe server 128 to receive the ProSe Code of Adam for Facebook in order to monitor for the presence of Adam. For an embodiment, the monitor request 310 includes the Facebook application ID and Adam's user ID.

The ProSe server 128 determines, at 312, whether to request Adam's Facebook ProSe code. For example, this includes the ProSe server 128 accessing George's list of Facebook friends to confirm that Adam is in George list of Facebook friends. Upon confirmation, the ProSe server 128 determines, using information received in the multicast message 230, that ProSe server 118 possesses the ProSe code allocated to Adam for Facebook. Correspondingly, ProSe server 128 sends a message 314 to the ProSe server 118 to request the ProSe Code for Adam for Facebook. The request message 314 indicates George's Facebook ID as the requesting user and Adam's Facebook ID as the monitored user.

ProSe server 118 determines, at 316, whether to communicate Adam's ProSe code for Facebook to the ProSe server 128. For example, the ProSe server 118 compares George (through his user ID) to the list of Adam's Facebook friends authorized or permitted to discover Adam. If George is on the list, the ProSe server 118 sends a response message 318 to the ProSe server 128, which includes the ProSe code for Adam for Facebook and the associated validity time, and may also include Adam's Facebook ID. The ProSe server 128 can now send a message 320 responding to the message 310 to monitor for the presence of Adam. For an embodiment, the response message 320 includes the application ID for Facebook, Adam's Facebook ID, Adam's ProSe code for Facebook, and the associated validity time.

George's UE 104 can now monitor 322 for the presence of Adam, for instance over local radio resources over which ProSe announcements are broadcast. For one example, George's UE 104 runs discovery procedures in the background, which can be based on WiFi-Direct, BLE, LTE-Direct, etc. When George's UE 104 is close enough to receive the announcements from Adam's UE 102 of Adam's ProSe code for Facebook, UE 104 can associate the ProSe code to Adam. UE 104 can, thereby, detect Adam's presence and discover Adam because UE 104 has previously stored thereon Adam's ProSe code that it received from ProSe server 128. George's UE 104 alerts George that his Facebook friend Adam is nearby, for example by using a pop-up notification. George's UE 104 can further prompt George to take certain actions, e.g. establish a Facebook chat in direct mode (from device to device), exchange photos in direct mode, etc.

For another embodiment where Adam and George are, for instance, subscribers to cellular services in the same PLMN A 110, George's UE 104 could alternatively request and receive Adam's ProSe code for Facebook from ProSe server 118 to use in discovering Adam. Conversely, if George is not a Facebook friend of Adam or if George is a Facebook friend of Adam but is not in the list friends who can discover Adam, UE 104 will not be able to retrieve Adam's Facebook ProSe code. UE 104 will, therefore, not be able to associate the broadcasted ProSe code with Adam to detect Adam's presence.

Figure 4:
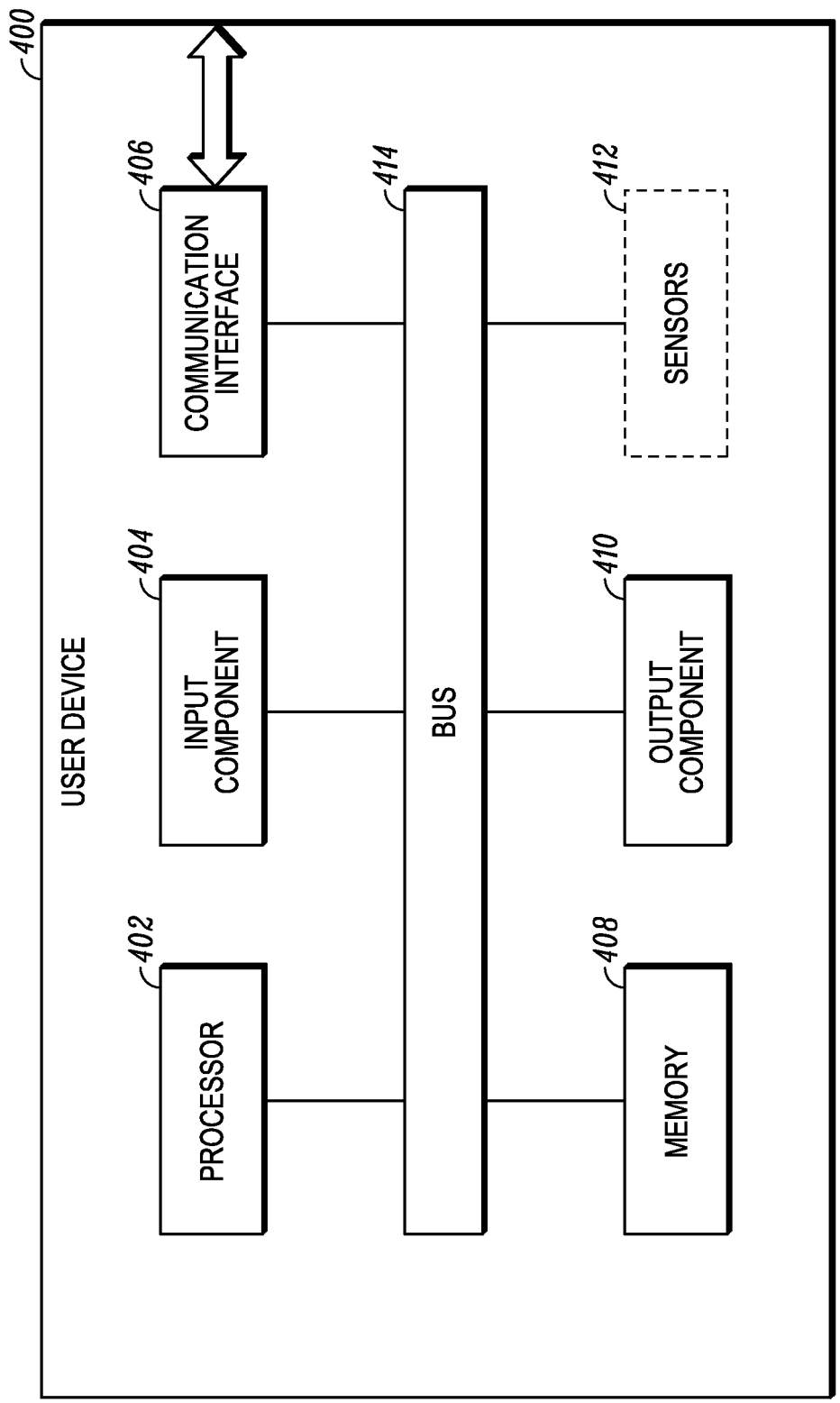
FIG. 4 is a block diagram illustrating internal hardware components of a user device configurable in accordance with some embodiments.

FIG. 4 shows a block diagram illustrating example internal hardware components of a user device 400, for example user devices 102 and 104 as illustrated in FIG. 1, which can be configured to facilitate implementation of embodiments according to the present teachings. "Adapted," "operative," "capable" or "configured," as used herein, means that the indicated device or components are implemented using one or more hardware elements, which may or may not be programmed with software and/or firmware as the means for the indicated components to implement their desired functionality. For a particular embodiment, the device 400 is a wireless communication device, which can be representative of a variety of mobile devices or user equipment including, for example, cellular telephones, personal digital assistants (PDAs), smart phones, laptop computers, tablets, phablets, or other handheld or portable electronic devices. Alternatively, the device 400 is a "fixed" computing device such as a desktop computer.

As shown in FIG. 4, the internal hardware elements or components of the user device 400 include at least one of each of a processor 402, an input component 404, a communication interface 406, a memory component 408, an output component 410, and optionally a set of sensors 412, for instance where device 400 is a portable device. As further illustrated, the internal components of the device 400 are operatively coupled to one another, and in communication with one another, by way of one or more internal communication links 414, for instance an internal bus. A limited number of device components 402, 404, 406, 408, 410, 412, and 414 are shown for ease of illustration, but other embodiments may include a lesser or greater number of such components in the device 400. Moreover, other well-known elements needed for a commercial embodiment of the device 400 may be omitted from FIG. 4 for brevity.

We now turn to a brief description of the components within the schematic diagram 400. The communication interface 406 allows for communication between the user device 400 and other electronic devices, such as a ProSe server or another user device. For one embodiment, the communication interface 406 includes one or more wireless transceivers such as a cellular transceiver, a WLAN transceiver, and a Global Positioning System (GPS) transceiver. More particularly, the cellular transceiver is configured to implement any suitable cellular or cellular-based technology to conduct cellular communications of data over a cellular network, such as the cellular networks 112 and 122 of FIG. 1. The WLAN transceiver can be a WiFi transceiver configured to conduct WiFi communications over a WiFi network, in accordance with the IEEE 802.11 (a, b, g, n or ac) standard. The communication interface 406 can also include one or more wireless transceivers configured to implement peer-to-peer communications using technology such as LTE direct, BLE, etc. Where, for instance, the device 400 is a fixed device, the communication interface 406 can include a wired communication interface used to communicate through a cable modem or a digital subscriber line (DSL).

The processor 402 includes arithmetic logic and registers necessary to perform the digital processing required by the device 400 to, for example, announce or monitor the presence of an application user in a manner consistent with the embodiments described herein. For one embodiment, the processor 402 represents a primary microprocessor or central processing unit (CPU) of the device 400 such as an application processor of a smartphone. In another embodiment, the processor 402 represents a baseband processor or other ancillary or standalone processor to the CPU that is used by one or more wireless transceivers. Depending, at least in part, on the particular function being performed and a given device 400 design, various functionality or protocols may be executed by the processor 400 in hardware or as software or firmware code.

For one example, the processor 402 implements a protocol stack or protocol suite having multiple "layers" that each have, include, contain, or implement one or more protocols, procedures, and/or algorithms that enable various functionality of the device 400. One such layer is an application layer that contains or implements various applications installed on the device 400 including, but not limited to, a social networking application, an Internet Protocol multimedia subsystem (IMS)-based application that supports voice or video over IP, file sharing, an application that communicates with a ProSe server, etc.

For an embodiment, the input component 404 includes: one or more visual input components such as a camera lens and photosensor; one or more acoustic receiver or audio input components such as one or more transducers (e.g., microphones); and one or more mechanical input components such as a touchscreen display, a flip sensor, keyboard, keypad selection button, and/or switch. Moreover, the output component 410 can include: one or more visual output components such as a liquid crystal display and/or light emitting diode indicator; one or more audio output components such as a speaker, alarm, and/or buzzer; and one or more mechanical output components such as a vibrating mechanism. The sensors 412 can be arranged with a sensor hub to manage one or more functions of the sensors. Example sensors 412 include, but are not limited to, proximity sensors (e.g., a light detecting sensor, an ultrasound transceiver or an infrared transceiver), touch sensors, altitude sensors, an accelerometer, a tilt sensor, and a gyroscope, to name a few.

The memory component 408 represents one or more memory elements of any of a variety of forms, for example read-only memory, random access memory, static random access memory, dynamic random access memory, etc. In an embodiment, the processor 402 uses the memory component 408 to store and retrieve data. In some embodiments, the memory component 408 is integrated with the processor 402 into a single component such as on an integrated circuit. However, such a single component still usually has distinct portions/sections that perform the different processing and memory functions. The data that is stored by the memory component 408 includes, but need not be limited to, operating systems, programs (e.g., applications, protocols, and other code), and informational data.

Configuring the user device 400 and one or more of the components therein can provide a user experience as described above by reference to functionality 208, 212, 220, 224, 228, and 232 of FIG. 2 for an application user to announce his presence for restricted discovery by selected other users. Configuring the user device 400 and one or more of the components therein can further provide a user experience as relates to monitoring to detect an application user that has authorized selected other users to discover his presence, for instance by reference to functionality 302, 304, 310, 320, and 322 of FIG. 3.

Figure 5:
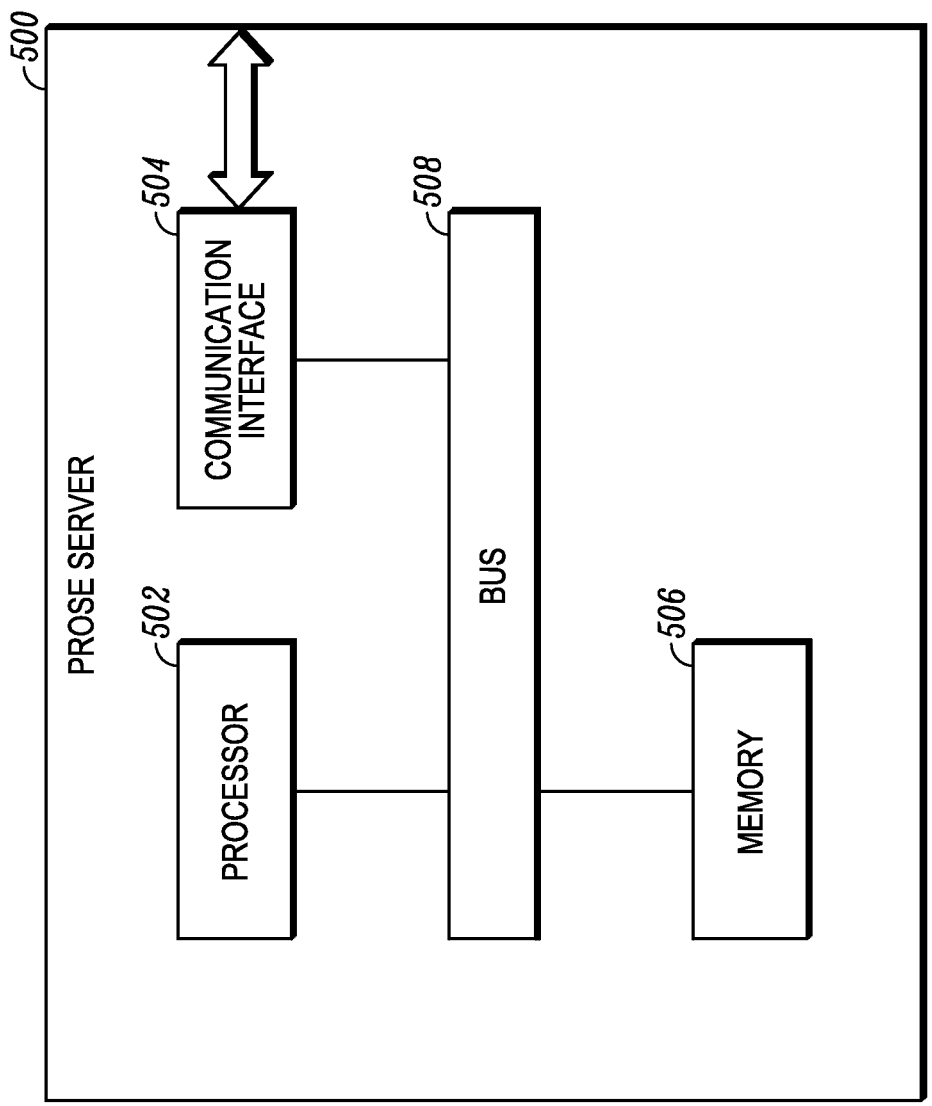
FIG. 5 is a block diagram illustrating internal hardware components of a ProSe server configurable in accordance with some embodiments.

FIG. 5 shows a block diagram illustrating example internal hardware components of a ProSe server 500, for example ProSe servers 118 and 128 as illustrated in FIG. 1. As shown in FIG. 5, the internal hardware elements or components of the ProSe server 500 include at least one of each of a processor 502, a communication interface 504, and a memory component 506. As further illustrated, the internal components of the ProSe server 500 are operatively coupled to one another, and in communication with one another, by way of one or more internal communication links 508, for instance an internal bus. A limited number of device components 502, 504, 506, and 508 are shown for ease of illustration, but other embodiments may include a lesser or greater number of such components in the ProSe server 500. Moreover, other well-known elements needed for a commercial embodiment of the ProSe server 500 may be omitted from FIG. 5 for brevity.

In general, at a hardware level, the device components 502, 504, 506, and 508 function as described for the analogous device components 402, 406, 408, and 414, respectively, shown in FIG. 4. However, one or more of the device components 502, 504, 506, or 508 may have some additional features. The communication interface 504, for example, might support more simultaneous connections than the communication interface 406, and the processor 502 might be configured for a greater computational load as compared to the processor 402. Nonetheless, the ProSe server 500 is configurable through one or more of its device components 502, 504, 506, and 508 to operate, for instance, as a first or second proximity-based services server in accordance with the embodiments described above by reference to the message sequence diagrams 200 and 300 illustrated respectively in FIG. 2 and FIG. 3.

For example, for a particular embodiment, the ProSe server 500 is configured, e.g., through the cooperative operation of the processor 502 and the communication interface 504, to operate as a first proximity-based services server. The first proximity-based services server performs a method that includes obtaining authorization (e.g., 214) to access a first user's resources for a first application. The method also includes communicating (e.g., 220) a list of associates from the first user's resources and receiving (e.g., 220) an indication of a set of associates selected from the list of associates. Each associate in the set is permitted to discover the first user. The method further includes receiving a request (e.g., 224) for a proximity-based services code and allocating (e.g., 226) a first proximity-based services code to the first user for the first application. Additionally, the method includes announcing (e.g., 230), to a set of other proximity-based services servers, existence of the first proximity-based services code allocated to the first user for the first application.

As described above, the first proximity-based services server communicates (e.g., 228) the first proximity-based services code to a device of the first user. Moreover, for an embodiment, the first proximity-based services server confirms authorization (e.g., 208, 212) of the first user for proximity-based services for the first application prior to allocating the first proximity-based services code, announcing the existence of the first proximity-based services code to the set of other proximity-based services servers, and communicating the first proximity-based services code to the device of the first user. For a further embodiment, communicating the list of associates from the first user's resources and receiving the indication of a set of associates permitted to discover the first user is facilitated, at the application layer, using a proximity-based services application.

For another embodiment, the ProSe server 500 is configured, e.g., through the cooperative operation of the processor 502 and the communication interface 504, to operate as a second proximity-based services server of the set of other proximity-based services servers. The second proximity-based services server performs a method that includes receiving (e.g., 230), from the first proximity-based services server, an indication of existence of the first proximity-based services code allocated to the first user for the first application. The method further includes requesting (e.g., 314), from the first proximity-based services server, the first proximity-based services code for providing to a second user that is an associate of the first user for the first application. The second proximity-based services server responsively receives (e.g., 318) the first proximity-based services code from the first proximity-based services server.

In accordance with yet another embodiment, the ProSe server 500 is configured, e.g., through the cooperative operation of the processor 502 and the communication interface 504, to operate as the second proximity-based services server to receive (e.g., 230), from a first proximity-based services server, a first message that indicates existence of a first proximity-based services code allocated to a first user for a social networking application. The second proximity-based services server is further configured to receive authorization (e.g., 304) to access a second user's resources for the social networking application and receive (e.g., 310), from a device of the second user, a request to monitor for presence of the first user. Furthermore, the second proximity-based services server is configured to determine (e.g., 312) whether to request, from the first proximity-based services server, the first proximity-based services code for determining when the first user is in proximity to the second user.

Furthermore, the processor 502 of the second proximity-based services server can be configured to determine (e.g., 312) whether to request the first proximity-based services code by being configured to: determine whether the first user is included in a list of friends from the second user's resources for the social networking application; and request the first proximity-based services code when the first user is included in the list of friends from the second user's resources. Additionally, the processor 502, of both the first and second ProSe servers, can be configured to join a multicast group to communicate (e.g., send and receive) the first message (e.g., 230), which indicates the existence of the first proximity-based services code allocated to the first user for the social networking application. Moreover, the processor 502 and communication interface 504 can be cooperatively configured to communicate (e.g., 320) the first proximity-based services code to the device of the second user for use in detecting presence of the first user when the second user is permitted to discover the second user.

In the foregoing specification, specific embodiments have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A method for facilitating restricted discovery of a first user of an application, the method comprising a first proximity-based services server performing:
    obtaining, from an application server, authorization to access first user resources for a first application hosted by the application server, wherein the first application is a social networking application;
    in response to obtaining authorization to access the first user resources, communicating, to a first user device associated with the first user, a list of associates from the first user resources, wherein the first user and the associates are registered users of the first application, and wherein a connection between each of the associates and the first user is pre-established via the first application;
    receiving, from the first user device, an indication of a set of associates selected from the list of associates by the first user, wherein each associate in the set of associates is permitted to discover the first user;
    receiving, via a proximity-based services application executing on the first user device, a request for a proximity-based services code, wherein the proximity-based services code facilitates discovery of the first user device;
    determining whether the first user is subscribed to proximity-based services associated with the first application;
    in response to determining that the first user is subscribed to proximity-based services associated with the first application, allocating a first proximity-based services code for the first application to the first user, wherein the first proximity-based services code is associated with a validity duration during which the first proximity-based services code can be broadcast by the first user device; and
    announcing, to a set of other proximity-based services servers, existence of the first proximity-based services code allocated for the first application to the first user until the validity duration expires.

2. The method of claim 1 further comprising the first proximity-based services server performing communicating the first proximity-based services code to the first user device associated with the first user.

3. The method of claim 2 further comprising the first proximity-based services server performing:
    confirming authorization of the first user for the proximity-based services for the first application prior to allocating the first proximity-based services code,
    announcing the existence of the first proximity-based services code to the set of other proximity-based services servers, and
    communicating the first proximity-based services code to the first user device associated with the first user.

4. The method of claim 2 further comprising the first proximity-based services server performing:
    receiving, from a second proximity-based services server of the set of other proximity-based services servers, a request for the first proximity-based services code allocated for the first user; and
    determining whether to communicate the first proximity-based services code to the second proximity-based services server.

5. The method of claim 4, wherein the request for the first proximity-based services code indicates a second user of the first application, wherein the determining of whether to communicate the first proximity-based services code to the second proximity-based services server comprises the first proximity-based services server performing:
comparing the second user to the set of associates permitted to discover the first user; and
communicating the first proximity-based services code to the second proximity-based services server when the second user is included in the set of associates permitted to discover the first user.

6. The method of claim 1, wherein the first proximity-based services code is used to determine presence of the first user when a second user device associated with the second user, which has received the first proximity-based services code from the first proximity-based services server, is in proximity to receive a broadcast of the first proximity-based services code allocated for the first application to the first user.

7. The method of claim 1, wherein the communicating of the list of associates from the first user resources and the receiving of the indication of the set of associates permitted to discover the first user is facilitated using the proximity-based services application executing on the first user device.

8. The method of claim 1, wherein the announcing of the first proximity-based services code comprises multicasting the first proximity-based services code to a group that includes the set of other proximity-based services servers.

9. The method of claim 1, wherein the obtaining of authorization to access the first user resources for the first application comprises the first proximity-based services server performing receiving an access token from the application server hosting the first application to use in performing application program interface calls to the application server on behalf of the first user.

10. The method of claim 9, wherein authorization to access the first user resources is obtained using OAuth protocol.

11. The method of claim 1, wherein the communicating of the list of associates from the first user resources comprises the first proximity-based services server performing communicating, to the first user device, a list of friends from the first user resources for the social networking application.

12. The method of claim 1, further comprising a first public land mobile network, and wherein the first public land mobile network includes the first proximity-based services server.

13. The method of claim 12, wherein the proximity-based service is a service provided by the first public land mobile network.

14. The method of claim 1, wherein the first proximity-based services server and the set of other proximity-based services server are included in a multicast group including a multicast address to facilitate exchanging secure communications.

* * * * *